(12) United States Patent
Chun et al.

(10) Patent No.: US 8,300,583 B2
(45) Date of Patent: Oct. 30, 2012

(54) METHOD FOR TRANSMITTING CONTROL INFORMATION IN A MOBILE COMMUNICATION SYSTEM

(75) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 432 days.

(21) Appl. No.: 12/448,822

(22) PCT Filed: Jan. 8, 2008

(86) PCT No.: PCT/KR2008/000103
§ 371 (c)(1),
(2), (4) Date: Jul. 9, 2009

(87) PCT Pub. No.: WO2008/084959
PCT Pub. Date: Jul. 17, 2008

(65) Prior Publication Data
US 2010/0008269 A1    Jan. 14, 2010

(30) Foreign Application Priority Data
Jan. 10, 2007  (KR) .................. 10-2007-0002952

(51) Int. Cl.
*H04W 4/00*  (2009.01)

(52) U.S. Cl. ...................... 370/329; 370/469

(58) Field of Classification Search .................. 370/310, 370/311, 329–338, 342, 349–350, 468–473
See application file for complete search history.

(56) References Cited

U.S. PATENT DOCUMENTS

| 2003/0045288 | A1  | 3/2003  | Luschi et al. |
| 2006/0007886 | A1* | 1/2006  | Lee et al. ................ 370/329 |
| 2006/0067238 | A1  | 3/2006  | Olsson et al. |
| 2006/0251027 | A1  | 11/2006 | Chun et al. |
| 2008/0049669 | A1* | 2/2008  | Lundby et al. ............ 370/329 |
| 2011/0158141 | A1* | 6/2011  | Lee et al. ................ 370/310 |

FOREIGN PATENT DOCUMENTS

| CN | 1879339 A | 12/2006 |
| JP | 2002-051001 A | 2/2002 |
| JP | 2005-522911 A | 7/2005 |
| WO | WO 2005048517 A1 * | 5/2005 |
| WO | WO 2005/067262 | 7/2005 |
| WO | WO 2005/122528 A1 | 12/2005 |
| WO | WO 2005125252 A1 * | 12/2005 |
| WO | WO 2006/118418 | 11/2006 |

OTHER PUBLICATIONS

3GPP TS 25.322 v6.9.0 (Sep. 2006), Technical Specification, "3$^{rd}$ Generation Partnership Project; Technical Specification Group Radio Access Network; Radio Link Control (RLC) protocol specification (Release 6)".

* cited by examiner

*Primary Examiner* — Pao Sinkantarakorn
*Assistant Examiner* — Iqbal Zaidi
(74) *Attorney, Agent, or Firm* — McKenna Long & Aldridge LLP

(57) ABSTRACT

A method for transmitting and receiving control information between AM RLC entities in a mobile communication system is provided. Especially, when a receiving-side AM RLC entity is connected to one or more logical channels, the receiving-side AM RLC entity sends control information through a specific one of the logical channels according to the contents of the control information to allow the transmitting side to quickly perform retransmission, thereby increasing the data transmitting rate.

16 Claims, 11 Drawing Sheets

METHOD FOR TRANSMITTING CONTROL INFORMATION IN A MOBILE COMMUNICATION SYSTEM

This application claims the benefit of PCT/KR2008/000103 filed on Jan. 8, 2008, and Korean Patent Application No. 10-2007-0002952 filed on Jan. 10, 2007, the contents of which are hereby incorporated herein by reference for all purposes in their entirety.

TECHNICAL FIELD

The present invention relates to a mobile communication system, and more particularly, to a method for transmitting control information in the mobile communication system.

BACKGROUND ART

The network must satisfy a number of requirements in order to provide fast data services to users in the downlink direction. For example, first requirement is the data transmitting rate. The data transmitting rate that can be actually supported in the physical layer is preferably high. Second requirement is the data retransmission rate. When some user data has not been successfully transmitted to a user Equipment (UE), the data is preferably retransmitted quickly.

The first requirement is supported by the physical layer and the second requirement is supported by the RLC (Radio Link Control) or MAC (Medium Access Control) layer which is an upper protocol layer. Two functions are required to meet the second requirement. The first function is to quickly determine which data the receiving side has not properly received and the second function is to transmit information, indicating which data the receiving side has not properly received, as quickly as possible to the transmitting side.

In one example, when an E-DCH (Enhanced Dedicated Channel) and a HARQ (Hybrid Auto Repeat Request) function in HSDPA (High Speed Downlink Packet Access) are used, a data block, which began to be transmitted from the transmitting side later than another data block, may successfully arrive at the receiving side earlier than the another data block which began to be transmitted earlier. Thus, the receiving side uses a reordering function in order to use the HARQ function without causing an error according to the data transmission order. Data blocks may arrive at the receiving side in a different order from that intended by the transmitting side unless the reordering function is used.

FIG. 1 illustrates an example where an error occurs according to the data transmission order.

With reference to FIG. 1, let us consider an error that may occur in a reset procedure. First, let us assume that "Y" is an HFN (Hyper Frame Number) value used by a transmitting-side RLC entity during data transmission while "X" is an HFN value used by a receiving-side RLC entity.

In FIG. 1, the transmitting-side RLC entity and the receiving-side RLC entity are represented as TX RLC and RX RLC, respectively.

First, the TX RLC transmits a PDU (Protocol Data Unit) 1 to a lower layer entity after ciphering it with an HFN of "Y" (S10). Before receiving the PDU 1, the RX RLC may initiate a reset procedure to transmit a reset PDU depending on an inner situation (S11). According to a general reset procedure, the TX RLC receives the reset PDU transmitted by the RX RLC and processes the received reset PDU and transmits a reset ACK (Acknowledgment) PDU in response to the reset PDU (S12). Here, an HFNI (Hyper Frame Number Indicator) set to "Z" is included in the reset ACK PDU to be transmitted.

As result of reset procedures, RX RLC set transmitting side HFN to "X" and receiving side HFN to "Z".

The RX RLC may receive the reset ACK PDU, which was transmitted later than the PDU 1 in the HARQ procedure performed at the lower layer entity, before receiving the PDU 1 (S12, S13). If the receiving order of RLC PDUs transmitted from the transmitting side is changed in this manner in the lower entity, the following problems may occur.

The RX RLC will set a receiving side HFN to "Z" after receiving the reset ACK PDU and then, the PDU 1 arrives at the RX RLC after the reset ACK PDU so that the RX RLC will decipher PDU 1 with "Z". Therefore, the RX RLC cannot properly decode the PDU 1 since the TX RLC ciphered the PDU 1 with the HFN value "Y".

Meanwhile, it is preferable that reception status information be transmitted quickly in order to increase the data transmitting rate. Even when a receiving-side RLC entity determines which RLC PDU it has failed to receive and immediately transmits its status information to a lower layer entity, the status information will not be able to be quickly transmitted between the receiving and transmitting-side RLC entities in the case where a data transmission delay has occurred at the lower layer entities of both the transmitting and receiving sides or where there is a need to perform reordering. In this case, it is not possible to achieve an increase in the data transmitting rate.

DISCLOSURE

Technical Problem

An object of the present invention devised to solve the above problems lies on providing a mobile communication system with improved performance.

Technical Solution

The object of the present invention can be achieved by providing an apparatus for transmitting control information in a mobile communication system, the apparatus including a first protocol entity receiving data from an upper layer and generating first control information and second control information; and a second protocol entity connected with the first protocol entity via a first channel and a second channel, wherein the first control information is transmitted via the first channel and the second control information is transmitted via the second channel.

The first control information may be transmitting-side-related control information. Here, the first control information may include at least one of RESET control information and move receiving window (MRW) control information.

The second control information may be receiving-side-related control information. Here, the second control information may include acknowledgement control information to inform whether the data has been received successfully at a receiving side.

The second channel may be configured to transmit only the second control information. The second channel may also be configured not to transmit the first control information and the data.

The data may be transmitted via the first channel.

The first protocol entity may be an Acknowledge Mode Radio Link Control (AM RLC) entity and the second protocol may be a Media Access Control (MAC) entity.

The first channel and the second channel may be mapped to an Enhanced-Dedicated Channel (E-DCH) which is located between the MAC entity and a physical layer.

The upper layer may be at least one of a Radio Resource Control (RRC) layer, a Packet Data Convergence Protocol (PDCP) layer, and a Broadcast/Multicast Control (BMC) layer.

The first control information may include at least one of first time information and second time information.

The first time information may be related to a start time for processing the first control information and the second time information may be related to a maximum time permitted for processing the first control information.

The first time information and the second time information may be configured by using at least one of a Connection Frame Number (CFN), a System Frame Number (SFN), a sequence number (SN) included in the data, and a value of a timer.

The second control information may include an indicator as to whether or not to pass reordering of the second control information.

The first control information and the second control information may be uplink control information.

Advantageous Effects

The present invention has an advantage in that a receiving-side RLC entity can transmit control information to the transmitting side as quickly as possible. The present invention also has an advantage in that the transmitting side can start retransmitting RLC PDUs as quickly as possible, thereby increasing the data transmitting rate in the mobile communication system.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Preferred embodiments associated with the above and other objects, configurations, and features of the present invention will be described in detail with reference to the accompanying drawings. The following detailed description given in conjunction with the drawings is intended to explain exemplary embodiments of the invention, rather than to illustrate the only embodiment which can be implemented according to the invention.

A description will now be given of examples where the embodiments of the present invention are implemented in a Universal Mobile Telecommunications System (UMTS) which is a European IMT-2000 communication system.

Figure 1:
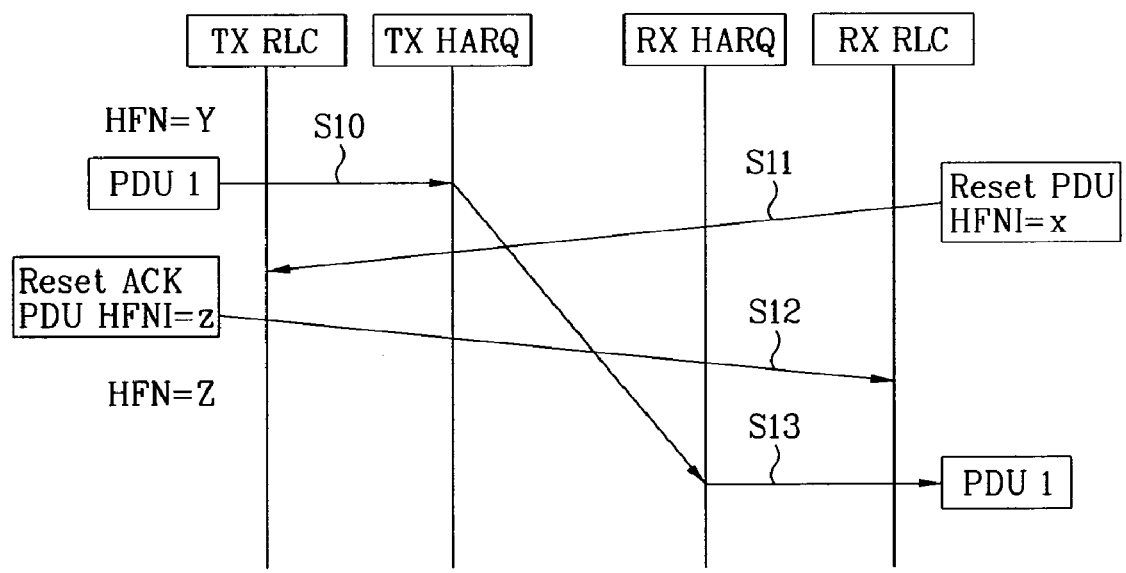
FIG. 1 illustrates an example where an error occurs according to the data transmission order.
Figure 2:
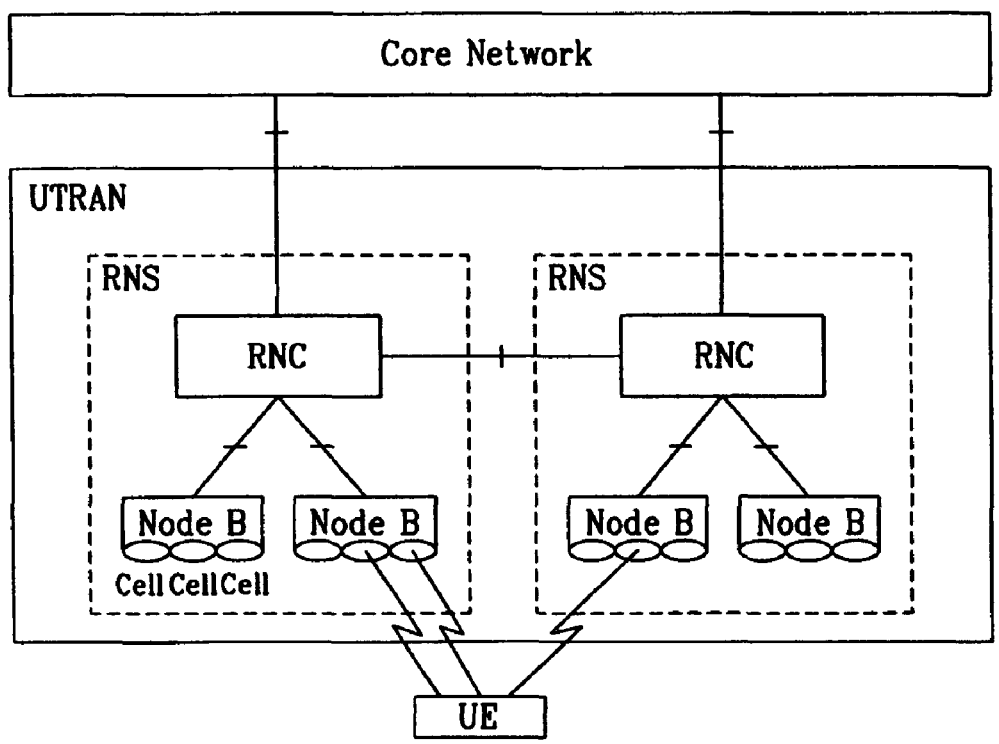
FIG. 2 illustrates a network structure of the UMTS (Universal Mobile Telecommunication System).

FIG. 2 illustrates a network structure of the UMTS.

The UMTS system mainly includes a User Equipment (UE), a UMTS Terrestrial Radio Access Network (UTRAN), and a Core Network (CN). The UTRAN includes one or more Radio Network Sub-systems (RNSs) and each RNS includes a Radio Network Controller (RNC) and one or more base stations (Node Bs) managed by the RNC. One Node B is associated with one or more cells.

Figure 3:
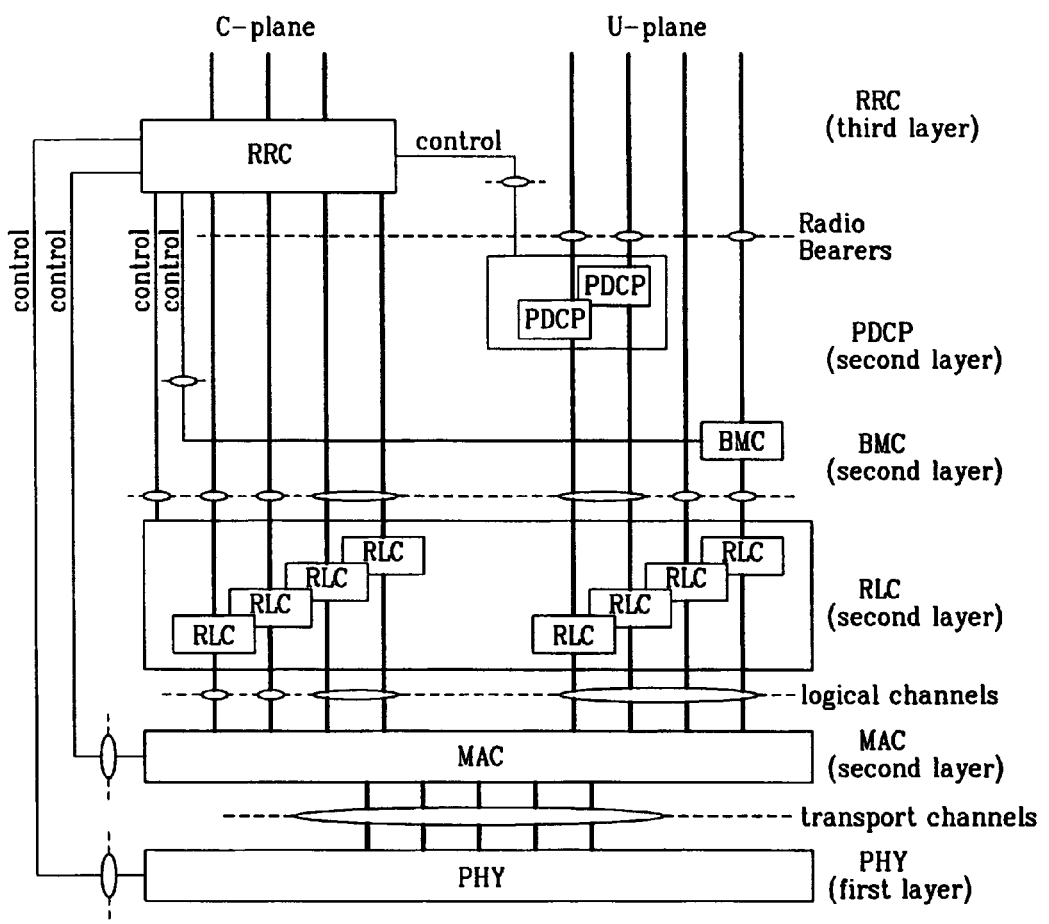
FIG. 3 illustrates a radio interface protocol structure used in the UMTS.

FIG. 3 illustrates a radio interface protocol structure used in the UMTS.

Pairs of radio interface protocols, which are present in the UE and the UTRAN, are responsible for transmitting data in a radio interface. Each radio interface protocol layer will now be described. First, a PHY layer, which is the first layer, functions to transmit data in the radio interface using various radio transmission technologies. The PHY layer is connected to a MAC layer, which is an upper layer, through a transport channel. The transport channel is classified into a dedicated transport channel and a common transport channel according to whether the channel is shared or not.

The second layer includes MAC, RLC, PDCP, and BMC layers. The MAC layer performs mapping various logical channels to various transport channels and also performs mapping and multiplexing various logical channels to a single transport channel. The MAC layer is connected to the RLC layer, which is an upper layer, through a logical channel. The logical channel is mainly classified into a control channel used to transmit control plane information and a traffic channel used to transmit user plane information, according to the type of transmitted information.

The MAC layer can be further classified into a MAC-b sublayer, a MAC-d sublayer, a MAC-c/sh sublayer, a MAC-hs sublayer, and a MAC-e sublayer, according to the type of managed transport channel. The MAC-b sublayer is responsible for managing a broadcast channel (BCH) which is a transport channel responsible for broadcasting system information. The MAC-d sublayer is responsible for managing a dedicated channel (DCH) which is a transport channel dedicated to a specific UE. The MAC-c/sh sublayer manages common transport channels, such as a forward access channel (FACH) and a downlink shared channel (DSCH), which are shared with other UEs. In order to support high-speed uplink and downlink data transmission, the MAC-hs sublayer manages a high-speed downlink shared channel (HS-DSCH) which is a transport channel for high-speed downlink data transmission and the MAC-e sublayer manages an enhanced dedicated channel (E-DCH) which is a transport channel for high-speed uplink data transmission.

The RLC layer is responsible for guaranteeing a QoS of each radio bearer (RB) and transmitting data according to the QoS. The RLC layer includes one or two independent RLC entities for each RB in order to guarantee the QoS of the RB and provides three modes, a transparent mode (TM), an unacknowledged mode (UM), and an acknowledged mode (AM), in order to support various QoSs. Each mode of the RLC will be described later in a more detailed description of the RLC layer. The RLC layer serves to adjust the size of data so as to be suitable for a lower layer to transmit the data in a radio interface. To accomplish this, the RLC layer also has a function to segment and/or concatenate data received from an upper layer.

The PDCP layer, which is located above the RLC layer, allows data to be efficiently transmitted over a radio interface with a relatively small bandwidth using an IP (Internet Protocol) packet such as IPv4 or IPv6. To accomplish this, the PDCP layer performs a header compression function, which is to allow only necessary information to be transmitted in a header of the data, thereby increasing the efficiency of transmission over a radio interface. The PDCP layer is present only in the Packet Service domain since the header compression is a basic function in the PDCP layer. One PDCP entity is provided for each RB in order to provide an efficient header compression function for each Packet service.

The second layer also includes a broadcast/multicast control (BMC) layer above the RLC layer. The BMC layer functions to schedule cell broadcast messages and to perform broadcasting to UEs located in a specific cell.

The Radio Resource Control (RRC) layer, which is the lowest of the third layer, is defined only in the control plane. The RRC layer is responsible for controlling parameters of the first and second layer in relation to the configuration, reconfiguration, and release of the radio bearers (RBs) and for controlling logical channels, transport channels, and physical channels. The RB is a logical path that provided by the first and second layers of the radio interface protocol for data transmission between the UE and the UTRAN. The configuration of an RB is generally a process for defining characteristics of radio interface protocol layers and channels required to provide a specific service and for setting their respective specific parameters and operating methods.

The following is a more detailed description of the RLC layer associated with the present invention.

The basic function of the RLC layer is to guarantee a QoS of each RB and to transmit data according to the QoS. All the layers of the second layer affect the QoS of the RB service since the RB service is provided by the second layer to an upper layer of the radio interface protocol. Especially, the RLC layer greatly affects the QoS. The RLC layer has an independent RLC entity for each RB in order to guarantee the QoS of the RB. As described above, the RLC layer provides three RLC modes, a transparent mode (TM), an unacknowledged mode (UM), and an acknowledged mode (AM), in order to support various QoSs.

The three RLC modes have different operating methods and also have different detailed functions since the three RLC modes support different QoSs. Accordingly, we need to describe the RLC entity according to the operating modes.

First one is a mode referred to as a transparent mode (TM). In this mode, no overhead is added to an RLC SDU (Service Data Unit) which is data received from an upper layer and RLC entity transparently passes an SDU to the lower layer. And, the RLC entity in this mode is referred to as a TM RLC entity.

Due to this characteristic, the TM RLC entity performs the following functions in the user and control planes. In the user plane, the TM RLC entity is mainly responsible for transmitting real-time circuit data such as voice or streaming data of the circuit service (CS) domain since the data processing time in the TM RLC entity is short. In the control plane, the TM RLC entity is mainly responsible for transmitting RRC messages from unspecified UEs in the uplink and for transmitting RRC messages to be broadcast to all UEs in the cell in the downlink since no overhead is present in the TM RLC entity in the control plane.

A mode in which an overhead is added unlike the transparent mode is referred to as a nontransparent mode. There are two types of nontransparent mode.

That is, second one is an unacknowledged mode (UM) in which there is no acknowledgement of reception of transmitted data and third one is an acknowledged mode (AM) in which there is acknowledgement of reception of transmitted data. And, the RLC entity in unacknowledged mode is referred to as a UM RLC entity and the RLC entity in acknowledged mode is referred to as a AM RLC entity.

The UM RLC entity transmits each PDU by adding a header including a sequence number (SN) to the PDU to allow the receiving side to determine which PDU has been lost during transmission. Due to this function, in the user plane, the UM RLC entity is mainly responsible for transmitting broadcast/multicast data or transmitting real-time packet data such as voice (e.g., VoIP) or streaming data of the packet service (PS) domain. In the control plane, the UM RLC entity is mainly responsible for transmitting RRC messages, which do not require acknowledgement of reception, among RRC messages transmitted to a specific UE or a specific UE group in the cell.

The AM, which is one of the nontransparent modes, is similar to the UM. The AM entity constructs a PDU by adding a header including an SN to the PDU, while the AM RLC entity greatly differs from the UM RLC entity in that the receiving side acknowledges reception of a PDU which the transmitting side has transmitted. The purpose of the receiving side's acknowledgement in the AM RLC entity is to request the transmitting side to retransmit a PDU that the receiving side has not received.

The retransmission is the most important feature of the AM. That is, the object of the AM is to guarantee error-free data transmission using the retransmission. To accomplish this object, in the user plane, the AM RLC entity is mainly responsible for transmitting non-real-time packet data such as TCP/IP data of the PS domain. In the control plane, the AM RLC is mainly responsible for transmitting RRC messages, which require acknowledgement of reception, among RRC messages transmitted to a specific UE in the cell.

When the RLC modes are compared in terms of directionality, the TM and UM are used in unidirectional communication while the AM is used in bidirectional communication since there is a feedback from the receiving side. It is preferable that the AM RLC entity use a dedicated logical channel since such bidirectional communication is generally used in point-to-point communication. The structural difference is that an UM RLC entity and a TM RLC entity can be configured to be a transmitting RLC entity or a receiving RLC entity, while an AM RLC entity consists of a transmitting side and a receiving side.

The AM RLC entity is complicated since it has the retransmission function. For retransmission management, the AM RLC entity includes a retransmission buffer in addition to transmitting and receiving buffers.

The AM RLC entity uses a transmitting window and a receiving window for flow control and can perform various functions such as a "Polling" function through which the transmitting side requests status information from the receiving side of a peer RLC entity, a "Status Report" function through which the receiving side reports its data reception status to the transmitting side of a peer RLC entity, a "Status PDU" function through which status information is carried, and a "Piggyback" function through which a status PDU is inserted into a data PDU in order to increase the efficiency of data transmission.

The AM RLC entity also has a "Reset PDU" function used when, upon detecting a serious error during operation, the AM RLC entity requests that a counterpart AM RLC entity reconfigure all operations and parameters and a "reset ACK PDU" function used to acknowledge such a reset PDU. In order to support these functions, the AM RLC entity can include various protocol parameters, status variables, and timers. PDUs such as a status information report or status PDU and a reset PDU used for the AM to control data transmission can be referred to as control PDUs and PDUs used to transfer user data can be referred to as data PDUs. That is, RLC PDUs used in the AM can be mainly classified into the two types, the first being data PDUs and the second being control PDUs. The control PDUs may include a status PDU, a piggybacked status PDU, a reset PDU, and/or a reset ACK PDU.

Reference will now be made in detail to structures of RLC PDUs used in the AM RLC entity. Table 1 illustrates an example structure of the data PDU.

TABLE 1

| D/C | Sequence Number | | Oct1 |
|---|---|---|---|
| Sequence Number | P | HE | Oct2 |
| Length Indicator | | E | Oct3 (Optional) (1) |
| . | | | |
| . | | | |
| Length Indicator | | E | |
| Data | | | |
| PAD or a piggybacked STATUS PDU | | | OctN |

As shown in Table 1, the data PDU may include D/C (Data/Control), sequence number (SN), P (Polling bit), HE (Header Extension Type), length indicator (LI), E (Extension bit), data, and/or PAD (Padding) fields.

The D/C field includes information indicating whether the corresponding AM RLC PDU is a data PDU or a control PDU. The sequence number field includes information of the sequence number of each RLC PDU. The P field is a polling bit including information indicating whether or not the receiving side is to transmit a status PDU. The HE field is provided at the end of the header and includes information indicating whether information included in the next field is a length indicator or data.

The length indicator field includes information indicating the boundary of different SDUs when the boundary of different SDUs is included in the data part of the data PDU. The E field indicates whether or not information included in the next field is a length indicator. The data field includes user data to be transmitted. The PAD field is a padding region that is not used in the RLC PDU.

The data PDU is used when an AM RLC entity is to transmit at least one of user data, piggybacked status information, which is transmitted together with data in a piggybacked manner, and a polling bit. The user data part is defined in units of 8 bits. That is, the user data part includes multiples of 8 bits. The data PDU header includes a sequence number of 20 octets. The data PDU header may include a length indicator.

Reference will now be made to example structures of control PDUs. Control PDUs can be divided into a status PDU, a piggybacked status PDU, a reset PDU, a reset ACK PDU, and the like. Table 2 illustrates an example of the status PDU structure.

TABLE 2

| D/C | PDU type | SUFI$_1$ | Oct1 |
|---|---|---|---|
| | SUFI$_1$ | | Oct2 |
| | ... | | |
| | SUFI$_K$ | | |
| | PAD | | OctN |

As shown in Table 2, the status PDU may include D/C, PDU type, SUFI$_k$(SUper Field), and/or PAD fields. The D/C field includes information indicating whether the corresponding RLC PDU is a data PDU or a control PDU as described above with reference to Table 1. The PDU type field includes information indicating the type of the control PDU. The PDU type field can be used to indicate whether the corresponding PDU is a reset PDU or a status PDU.

The SUFI$_k$ field includes information indicating which RLC PDU has arrived at a receiving side of user data or the like, which RLC PDU has not arrived at the receiving side, and the like. The SUFI includes three parts: type, length, and value. That is, the status PDU may include different types of SUFIs. While the length (or size) of the status PDU is variable, it is limited below the size of the largest RLC PDU of a logical channel through which the status PDU is transmitted. The SUFI field may also include information indicating which RLC SDU has been deleted and will no longer be transmitted by the transmitting side of user data.

A piggybacked status PDU can be used when a space large enough to include control information is left after user data is filled in the data PDU. That is, control information can be included in a part of the data PDU that is left after it is filled with user data. Here, the control information part can be referred to as a piggybacked status PDU.

Table 3 illustrates an example structure of the piggybacked status PDU.

TABLE 3

| R2 | PDU Type | SUFI$_1$ | Oct1 |
|---|---|---|---|
| | SUFI$_1$ | | Oct2 |
| | ... | | |
| | SUFI$_K$ | | |
| | PAD | | OctN |

As shown in Table 3, the structure of the piggybacked status PDU is similar to that of the status PDU while having a difference in that the D/C field is replaced with a reserved bit (R2) field. Since the piggybacked status PDU is transmitted within the data PDU as described above, it does not matter even if the piggybacked status PDU does not include a separate D/C field and therefore the D/C field can be replaced with the R2 field. The R2 field may not include information and may also include information when needed.

While the PDU type field may include information indicating the type of the control PDU as in the cases of Table 1 and Table 2, it is preferable that the PDU type field include a specific fixed value since the piggybacked status PDU is generally transmitted together with a data PDU. For example, when the corresponding RLC PDU is a piggybacked status PDU, a value included in its PDU type field can be fixed to "000".

Table 4 illustrates an example structure of the reset PDU and reset ACK PDU.

TABLE 4

| D/C | PDU Type | RSN | R1 | Oct1 |
|---|---|---|---|---|
| | HFNI | | | |
| | HFNI | | | |
| HFNI | | | | |
| | PAD | | | OctN |

As shown in Table 4, the reset PDU and reset ACK PDU may include D/C, PDU type, RSN (Reset Sequence Number), R1 (Reserved 1), HFNI, and/or PAD fields. Descriptions of the D/C, PDU type, and/or PAD fields are apparent from the descriptions of Tables 1 to 3.

The RSN field includes information of a sequence number associated with a reset process. The sequence number included in the RSN field may include 1-bit information. The reset ACK PDU is transmitted in response to a received reset PDU. The transmitted reset ACK PDU includes the same RSN value as that included in the received reset PDU, thereby making it possible to determine which reset PDU the transmitted reset ACK PDU is in response to. That is, the RSN value is used to associate each reset PDU with a corresponding reset ACK PDU.

For example, when the transmitting side has transmitted a reset PDU with an RSN value set to "1", the transmitting side identifies reset ACK PDUs with an RSN value set to "1" only as its desired reset ACK PDUs. That is, when receiving a reset ACK PDU with an RSN value set to a number other than "1", the transmitting side determines that the received reset ACK PDU is a wrong one and can discard or disregard the received reset ACK PDU. It is preferable that the value of the RSN field be incremented by one each time a reset procedure starts.

It is preferable that the reserved bit (R1) field be used in the reset PDU/reset ACK PDU and be fixed to a specific value. For example, the R1 field can be coded or transmitted with a fixed value of "000".

The HFNI field includes information associated with ciphering when some values included in the corresponding RLC PDU are ciphered and transmitted. It is preferable that the transmitting side set the HFNI field value to the maximum HFN value used in the transmitting side. The HFN value is used for ciphering in the following manner. Each time the transmitting side transmits an RLC PDU, the transmitting side can cipher a part of the RLC PDU, other than an SN value, using an HFN value. The receiving side can decipher a received RLC PDU using the same HFN value as that used in the transmitting side. If the receiving and transmitting sides do not have the same HFN value, a problem occurs in a decoding procedure, thereby making it difficult to continue communication.

Thus, it is preferable that the transmitting and receiving sides exchange their HFN values during a reset procedure so as to make their HFN values identical. Accordingly, the transmitting and receiving sides can transmit their HFN values through the HFNI fields included in the reset PDU and the reset ACK PDU.

Reference will now be made to a reset procedure at an RLC entity. The reset procedure can be initiated while a reset PDU is transmitted. The following description will be given of an example where the receiving side of user data initiates the reset procedure although any of the transmitting and receiving sides can initiate the reset procedure.

The receiving side transmits a reset PDU to the transmitting side. A retransmission procedure can be performed when a status PDU including an erroneous sequence number has been received, a specific PDU has failed to be transmitted a predetermined number of times, or the like. When the transmitting side has received a reset PDU transmitted by the receiving side, the transmitting side stops transmitting an RLC PDU and a status PDU. Then, when an RLC PDU, a status PDU, or a piggybacked status PDU has been received, the received RLC PDU, status PDU, or piggybacked status PDU can be disregarded.

At least two parameters can be configured and used in the transmitting side in order to perform the reset procedure. For example, VR(RST) is set for a first parameter and used as a value that is incremented by one each time the reset procedure is performed. And, MaxRST is set for a second parameter and used as a maximum value above which a reset PDU cannot be transmitted during a reset procedure. That is, when reset PDU transmission has been performed exceeding the MaxRST value, the reset procedure is immediately terminated and an upper layer is informed that an uncorrectable error has occurred.

Reference will now be made to how a reset procedure is performed using the VR(RST) and MaxRST values. The transmitting side receives a reset PDU and increments the VR(RST) value by one. The transmitting side then compares the incremented VR(RST) value with the MaxRST value. If the result of the comparison is that the incremented VR(RST) value is greater than the MaxRST value, the transmitting side transmits information indicating this situation to the RRC layer which is an upper layer. If the incremented VR(RST) value is less than the MaxRST value, the transmitting side transmits a reset ACK PDU to the receiving side.

The receiving side operates in the following manner when receiving a reset PDU. First, the receiving side compares an RSN value that was used in a last reset procedure, which was performed most recently, with an RSN value included in the currently received reset PDU. If the comparison result is that the RSN values are identical, the receiving side retransmits a reset ACK PDU with the same value as that of the reset ACK PDU that was transmitted previously.

The receiving side then constructs and transmits a new reset ACK PDU if the currently received reset PDU is the first reset PDU received after the corresponding RLC entity was established or reestablished or if the comparison result is that the RSN value of the currently received reset PDU is different from that of the reset PDU that was received most recently.

The receiving side then resets state variables and deactivates timers. The receiving side then discards RLC PDUs that have been received and discards RLC SDUs that have been transmitted before the corresponding reset procedure. The receiving side then resets respective HFN values of its receiving and transmitting directions. For example, the receiving side can transmit a HFN value which is one higher than the previous HFN value through a HFNI field in a reset ACK PDU. It is preferable that the receiving side transmit the highest HFN value used in its transmitting direction by filling the HFNI field with the highest HFN value as described above.

The transmitting side operates in the following manner when receiving a reset ACK PDU while waiting until the reset ACK PDU is received after transmitting a reset PDU. First, the transmitting side compares an RSN value included in the received reset ACK PDU with an RSN value included in a reset PDU that it previously transmitted. If the comparison result is that the RSN values are identical, the transmitting side performs the following procedure. Otherwise, the transmitting side discards the received reset ACK PDU.

The transmitting side resets an HFN value of its receiving direction to the HFN value included in the HFNI field of the received reset ACK PDU. The transmitting side then resets state variables and deactivates timers. The transmitting side then discards RLC PDUs that have been received and RLC SDUs that have been transmitted before the resetting.

The transmitting side then resets an HFN value of its transmitting direction according to the reset HFN value of its receiving direction. That is, the transmitting side increments the HFN value by one according to the above example. After this reset procedure is performed, the HFN values of the transmitting and receiving sides become identical, so that it is possible to perform ciphering and deciphering procedures through the same HFN value.

Reference will now be made to a High Speed Downlink Packet Access (HSDPA).

In the 3GPP, study is currently being conducted to evolve the UMTS network to provide high speed data transmission. The representative system is the HSDPA. Many new techniques have been introduced to implement the HSDPA. One of these techniques is HARQ.

The HARQ method is a retransmission method conceptually different from the packet retransmission method that is performed at the RLC layer. The HARQ method is used in association with the physical layer and combines retransmitted data with previously received data to guarantee a higher recovery capability. That is, this method stores packets that have failed to be transmitted without discarding the packets and combines the packets with retransmitted packets in a step prior to decoding to recover the packets.

A HARQ block is provided in a MAC-hs sublayer of a Node B in order to more efficiently support the HARQ function. The HARQ block includes HARQ entities that manage HARQ operations of UEs which support the HARQ function. Preferably, one HARQ entity is provided for each UE. Multiple HARQ processes are provided in each HARQ entity. Each HARQ process is responsible for control of HARQ operations and is used to transmit specific data.

Although each HARQ process can be shared by multiple data, it can process only one data in a single transmission time interval (TTI). When a process has successfully transmitted data, the process becomes empty so that it can be used to transmit another data. However, when a process has failed to transmit data, the process stores the data until the data is successfully transmitted or is discarded.

The following is a more detailed description of data transmission at MAC-hs of a Node B. The Node B reconstructs a plurality of data received from an RNC to create MAC-hs PDUs and allocates the MAC-hs PDUs to respective HARQ processes. MAC-hs PDUs transmitted from the HARQ processes may be or may not be successfully delivered to a UE at a time.

For example, let us assume that a MAC-hs PDU "1" that was previously created is allocated to a HARQ process "A" and a MAC-hs PDU "2" that was created at a later time is allocated to a HARQ process "B". The HARQ processes operate independently of each other although they do not perform transmission at the same time. Thus, the HARQ process "A" may repeatedly fail to transmit data while the HARQ process "B" may successfully transmit data earlier than the HARQ process "A", so that the UE may receive and process the later-created MAC-hs PDU "2", which includes data that was received by the Node B at a later time, earlier than the previously created MAC-hs PDU "1". That is, MAC-hs PDUs may be delivered to the UE out of sequence from that in which they were created at the Node B because of one HARQ process (the HARQ process "A"). This indicates that RLC PDUs included in MAC-hs PDUs may not be delivered to the RLC layer (or entity) in sequence.

Figure 4:
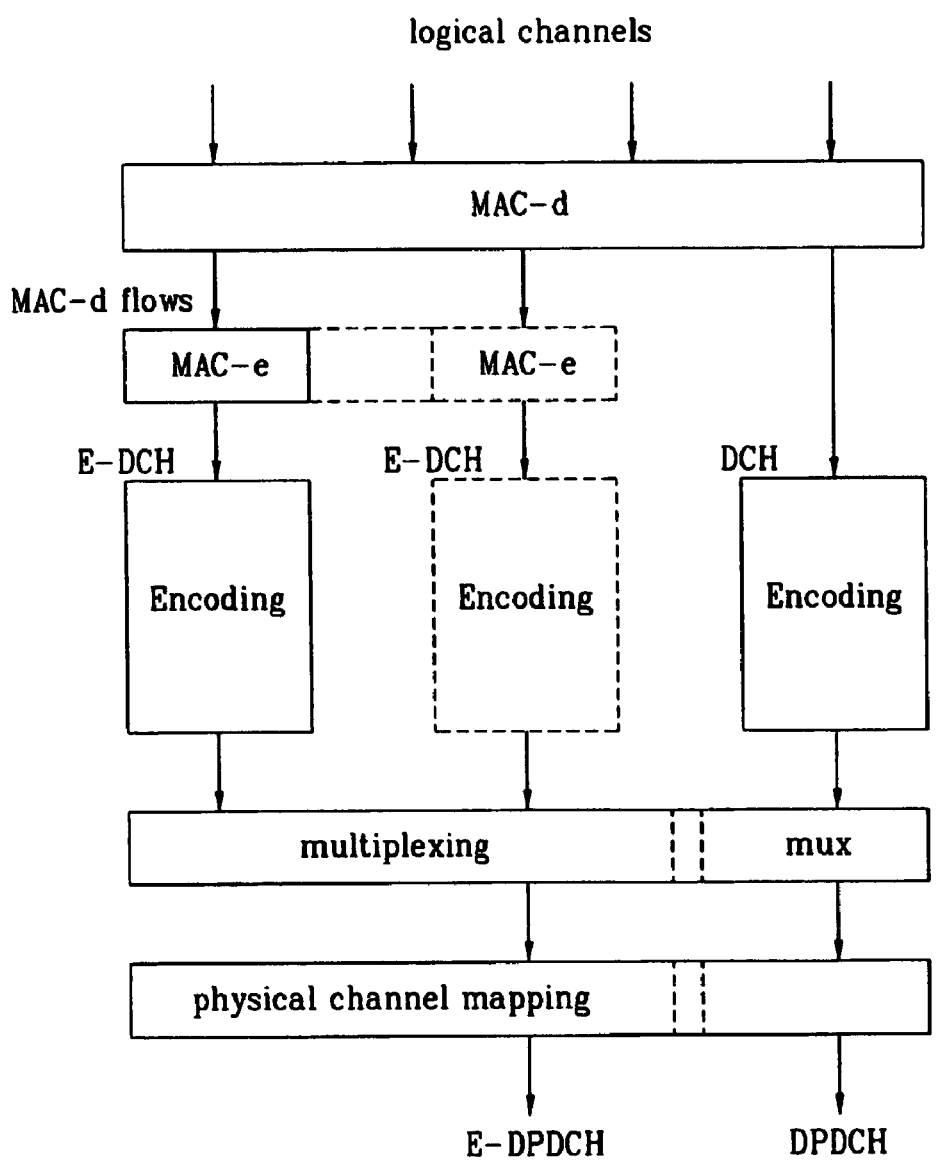
FIG. 4 illustrates structures of a DCH and an E-DCH.

FIG. 4 illustrates structures of a DCH and an E-DCH.

Both the DCH and the E-DCH are transport channels which are dedicated to a single UE. Especially, the E-DCH, which is used to transmit uplink data to the UTRAN, can transmit uplink data at a higher rate than the DCH. In order to transmit data at a high rate, the E-DCH can use technologies such as Hybrid ARQ (HARQ), Adaptive Modulation and Coding (AMC), and Node B controlled scheduling.

For the E-DCH, the Node B transmits downlink control information, which controls E-DCH transmission of the UE, to the UE. The downlink control information includes acknowledgement information (ACK/NACK) for HARQ, channel quality information for AMC, and E-DCH transmission start time, transmission time interval allocation information, and E-DCH transmission rate allocation information for Node B controlled scheduling, or the like.

On the other hand, the UE transmits uplink control information to the Node B. The uplink control information includes UE buffer status information, UE power status information, and E-DCH transmission rate request information for Node B controlled scheduling, or the like. The uplink control information and downlink control information for the E-DCH can be transmitted through a physical control channel such as an E-Dedicated Physical Control Channel (E-DPCCH).

For the E-DCH, a MAC-d flow is defined between MAC-d and MAC-e. Here, a dedicated logical channel can be mapped to the MAC-d flow, the MAC-d flow can be mapped to a transport channel "E-DCH", and the transport channel "E-DCH" can be mapped in turn to a physical channel "Enhanced Dedicated Physical Data Channel (E-DPDCH)". On the other hand, the dedicated logical channel can be mapped directly to the transport channel "DCH". Here, the transport channel "DCH" can be mapped to a physical channel "Dedicated Physical Data Channel (DPDCH)".

As explained above in the description of the protocol layer structure, the MAC-d sublayer shown in FIG. 4 is responsible for managing the Dedicated Channel (DCH) which is a transport channel dedicated to a specific UE and the MAC-e sublayer is responsible for the Enhanced Dedicated Channel (E-DCH) which is a transport channel used for high-speed uplink data transmission.

Figure 5:
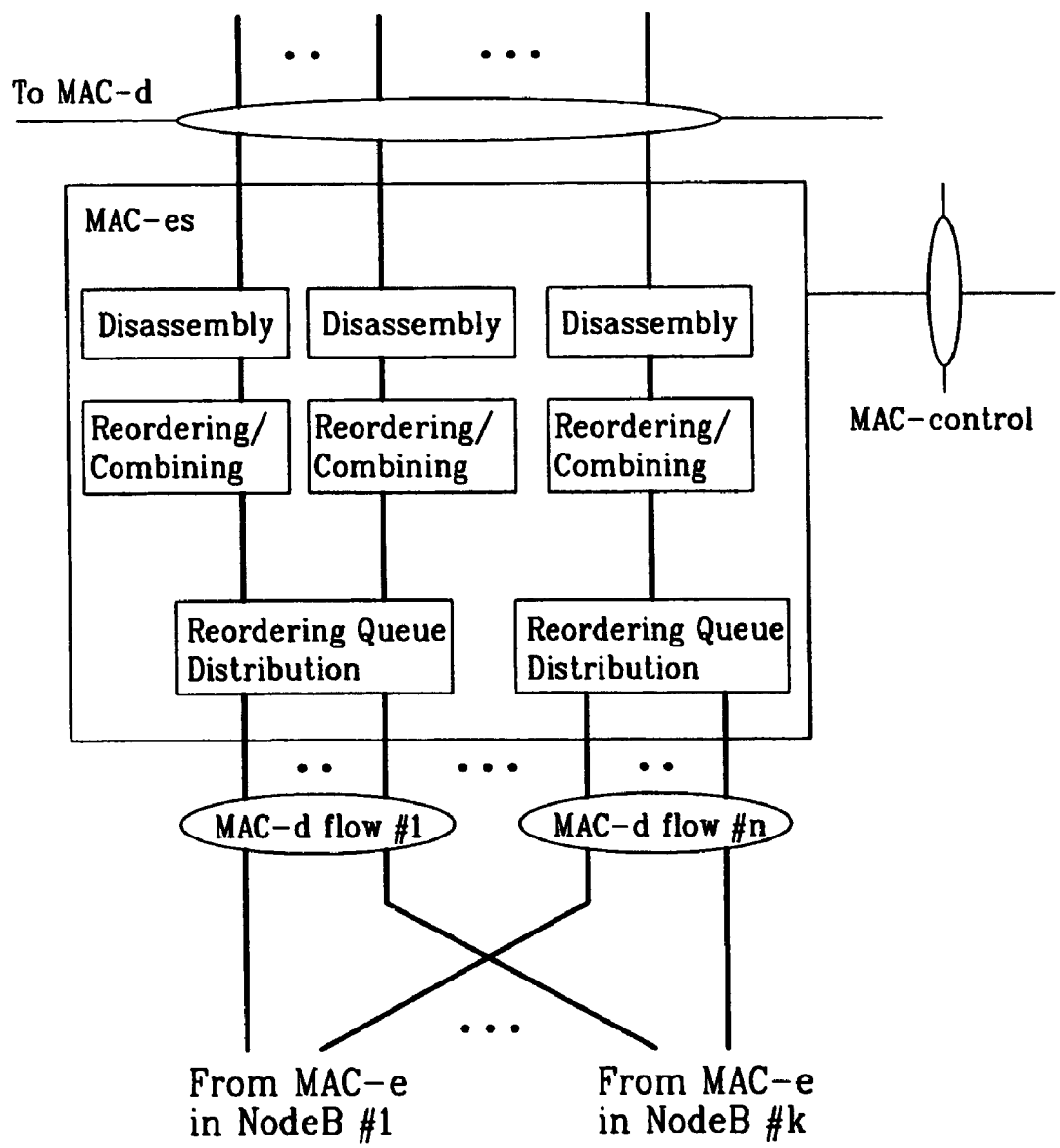
FIG. 5 illustrates a structure of a MAC-es sublayer located at an RNC (Radio Network Controller), required to support the E-DCH.

FIG. 5 illustrates a structure of a MAC-es sublayer.

The MAC-es sublayer is a layer that is located in the RNC and is used to support the E-DCH. The MAC-es sublayer reorders MAC-es PDUs received from the MAC-e sublayer. Particularly, when one or more Node Bs are used for the E-DCH, MAC-e PDUs successfully received by the Node Bs are disassembled into MAC-es PDUs. The MAC-es PDUs are finally reordered in the MAC-es sublayer. The MAC-es sublayer then disassembles the MAC-es PDUs into MAC-d PDUs or RLC PDUs and transmits the MAC-d PDUs or RLC PDUs to an upper layer.

Figure 6:
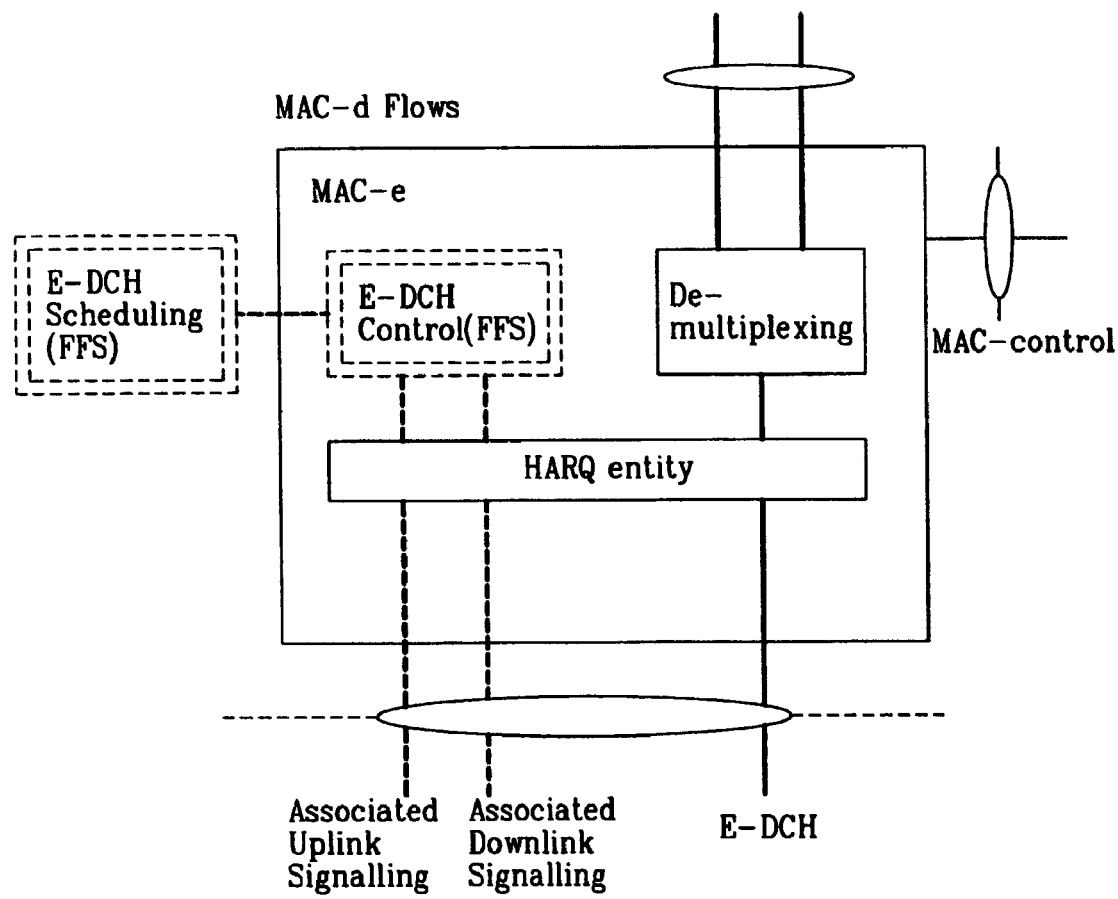
FIG. 6 illustrates a structure of a MAC-e sublayer located at a Node B, required to support the E-DCH.

FIG. 6 illustrates a structure of a MAC-e sublayer.

The MAC-e sublayer located in the Node B, which is required to support the E-DCH, actually manages control of radio protocol layers in association with the E-DCH, actually controls transmission of MAC-e PDUs, and is responsible for scheduling and HARQ. The MAC-e sublayer segments successfully-received MAC-e PDUs into MAC-es PDUs and transfers the MAC-es PDUs to the MAC-es sublayer.

Reference will now be made to a method in which an RLC entity, which has received user data, transmits control information (for example, status information) to the transmitting side as quickly as possible and the transmitting side starts retransmitting RLC PDUs as quickly as possible, thereby increasing the data transmitting rate.

Figure 7:
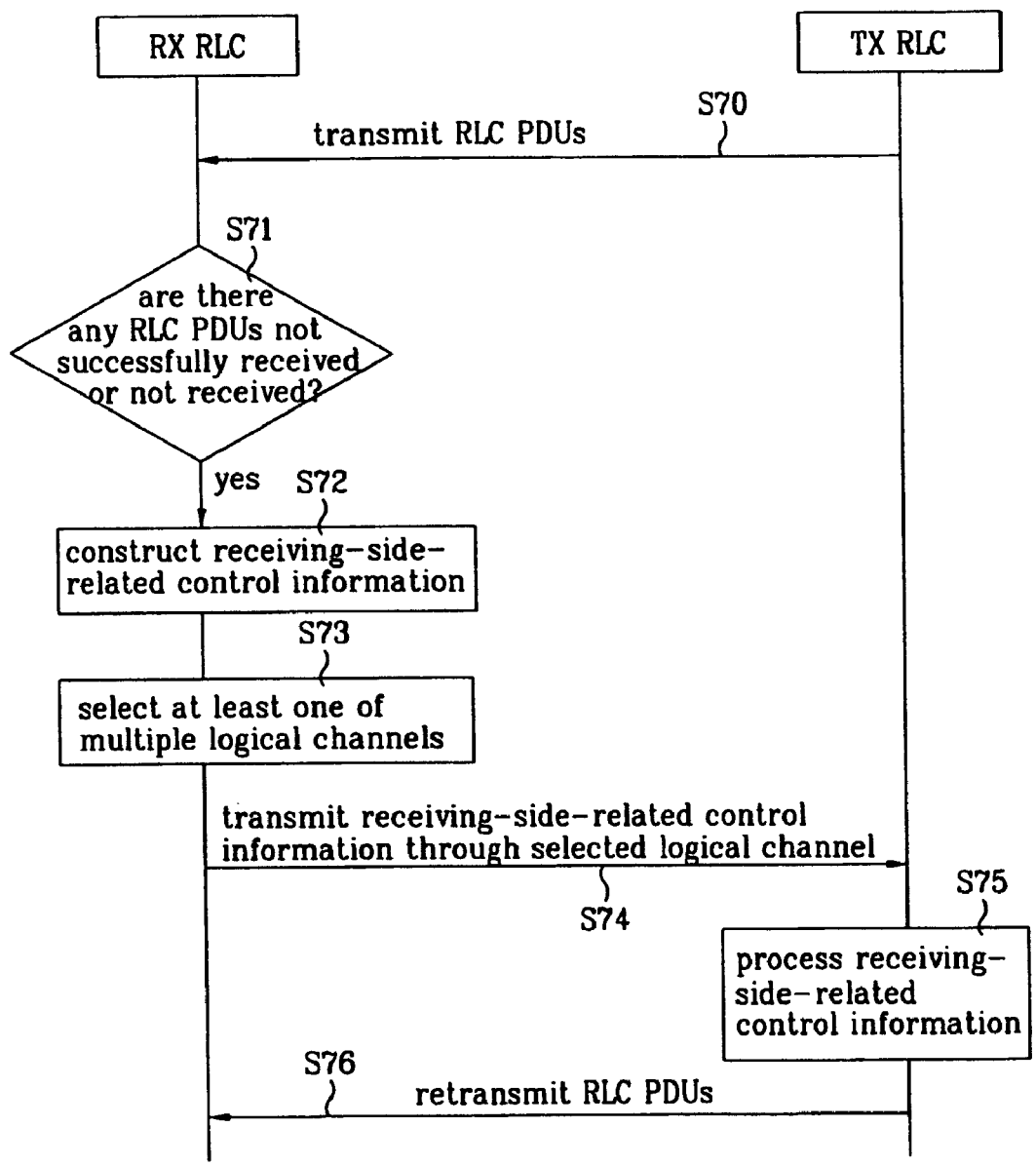
FIG. 7 is a flow chart illustrating an embodiment of the invention.

FIG. 7 is a flow chart illustrating an embodiment of the invention.

According to this embodiment of the invention, multiple logical channels are set in a single RLC entity in order to allow an RX RLC entity to quickly transmit control information (for example, status information) to the transmitting side of data. In this case, since there are multiple channels through which the RX RLC entity can transmit an RLC PDU, the RLC entity can transmit an RLC PDU selectively using the multiple logical channels according to the characteristics and contents of the RLC PDU to be transmitted. Here, the RLC PDU may be an STATUS PDU for transmitting status information to the transmitting side. That is, the RLC entity transmitting status information can select a logical channel, which can transmit status information most quickly, among multiple logical channels connected to the transmitting side RLC entity and can transmit status information through the selected logical channel. The RLC entity is preferably the AM RLC entity described above.

As shown in FIG. 7, first, a TX RLC entity transmits RLC PDUs (S70). When receiving the RLC PDUs at a RX RLC entity, the RX RLC (entity) checks the received RLC PDUs (S71). If the checked result is that some RLC PDUs have not been successfully received or some RLC PDUs have not arrived at its buffer, the RX RLC entity constructs status information indicating whether or not data has been successfully received (S72). The RX RLC entity then transmits the constructed control information through one of the multiple preset logical channels (S73, S74). Here, the RX RLC entity can use a status PDU in order to transmit the status information. When receiving the status information at the TX RLC entity, the TX RLC entity processes it and retransmits corresponding RLC PDUs when needed (S76).

Providing multiple channels in this manner will provide advantages in that the transmitting data rate of control information can be increased and control information can be transmitted through a channel selected appropriately according to the type of the control information.

Figure 8:
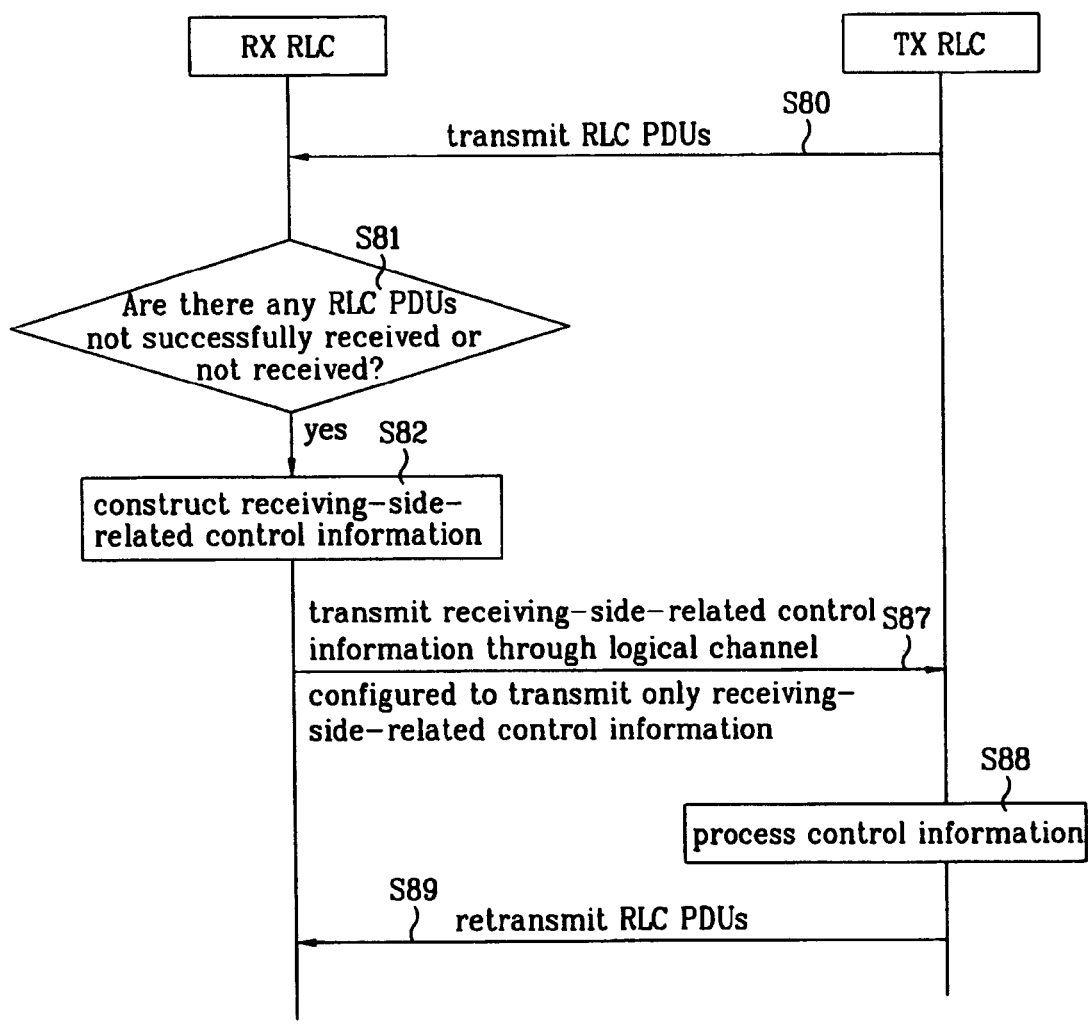
FIG. 8 is a flow chart illustrating another embodiment of the invention.

FIG. 8 is a flow chart illustrating another embodiment of the invention.

This embodiment of the invention suggests that control information be classified into transmitting-side-related control information and receiving-side-related control information and the two control information are transmitted using different messages. That is, the receiving-side-related control information and the transmitting-side-related control information are not transmitted together in a single message.

In this method, although transmitting-side-related control information and receiving-side-related control information can be transmitted through the same channel, it is preferable that the transmitting-side-related control information and the receiving-side-related control information be transmitted using different channels.

The receiving-side-related control information is control information that an AM RLC entity provides with being related to received RLC PDUs or RLC SDUs when receiving the RLC PDUs or RLC SDUs. More specifically, the receiving-side-related control information is control information created by a receiving-side AM RLC entity and indicates, for example, which AM RLC PDUs have been successfully received by the receiving-side AM RLC entity and which AM RLC PDUs have not been successfully received.

That is, when a receiving-side AM RLC entity provides control information indicating which AM RLC PDU has been successfully received and which AM RLC PDU has not been successfully received after receiving AM RLC PDUs from the transmitting side, the control information can be classified as receiving-side-related control information.

The transmitting-side-related control information is control information that an AM RLC entity provides with being related to transmitting RLC PDUs or RLC SDUs. More specifically, the transmitting-side-related control information is control information, created by a transmitting-side AM RLC entity and indicates which AM RLC PDUs have been discarded by the transmitting-side AM RLC entity and which AM RLC PDUs will no longer be transmitted by the transmitting-side AM RLC entity.

That is, when a transmitting-side RLC entity provides control information indicating which AM RLC PDUs have been discarded by the transmitting-side AM RLC entity and which AM RLC PDUs will no longer be transmitted by it, the control information can be classified as transmitting-side-related control information.

For example, it is preferable that control information associated with the reset procedure described above be processed as transmitting-side-related control information. That is, the reset PDU or reset ACK PDU can be classified as transmitting-side-related control information. It is also preferable that control information associated with a move receiving window (MRW) procedure be classified as transmitting-side-related control information.

Here, the MRW procedure can be described as a procedure which the transmitting side uses to inform the receiving side when the transmitting side has discarded some RLC SDUs and will no longer transmit them. A transmission window may be adjusted as a result of this procedure. That is, when the transmitting side decides to delete some RLC SDUs and to no longer transmit them to the receiving side, the transmitting side informs the receiving side of the decision using a MRW SUFI. When successfully receiving the MRW SUFI, the receiving side performs an operation according to the contents of the MRW SUFI and then transmits an MRW ACK SUFI to the transmitting side to inform the transmitting side that the MRW procedure has been successfully completed. That is, the MRW SUFI or MRW ACK SUFI can be classified as transmitting-side-related control information.

Referring to FIG. 8, the TX RLC entity transmits RLC PDUs to the RX RLC entity as in FIG. 7 (S80). When the RX RLC entity has not successfully received or has not received some of the RLC PDUs (S81), the RX RLC entity constructs control information (S82). According to the above classification method, the control information is classified as receiving-side-related control information since it is control information associated with the received data (i.e., RLC PDUs or RLC SDUs).

The RX RLC entity constructs and transmits receiving-side-related control information to the TX RLC entity. Here, multiple channels are configured in the TX RLC entity. Preferably, some of the multiple channels are configured as channels dedicated to receiving-side-related control information so that only the receiving-side-related control information is transmitted through the channels. That is, at least one logical channel is used only to transmit control information. In this case, logical channels other than the dedicated channel can be configured to be used only to transmit actual user data or can be configured to be used to transmit both user data and control information.

If transmitting-side-related control information arrives at the peer RLC entity earlier than a data block transmitted prior to the control information, a problem occurs in data reception and decoding procedures as described above. However, the transmitting-side-related control information is not associated with user data that is to be transmitted by an RLC entity which transmits receiving-side-related control information.

Accordingly, no problem occurs in transmission of user data even when the receiving-side-related control information arrives at the peer RLC entity earlier than the user data transmitted by the RLC entity that has transmitted the receiving-side-related control information. Accordingly, in the case where the receiving-side-related control information is not highly associated with the arrival order, a separate channel dedicated to the receiving-side-related control information can be configured to increase the transmission/reception data rate and processing speed.

The following are examples of configuring of a channel dedicated to the receiving-side-related control information. In the following description, it is assumed that two logical channels have been configured in an AM RLC entity. However, it is apparent that the same or similar method can also be applied when three or more channels have been configured.

In one method of configuring a channel dedicated to receiving-side-related control information, an AM RLC entity is connected to two logical channels as assumed above and the first of the two logical channels is used to transmit user data and control information other than the receiving-side-related control information and the second logical channel is used only to transmit the receiving-side-related control information.

The AM RLC entity (i.e., the RX RLC entity) receives RLC PDUs from the peer AM RLC entity (i.e., the TX RLC entity) and constructs receiving-side-related control information (for example, ACK/NACK information) when the RX RLC entity has detected that it has not successfully received some RLC PDUs or that some RLC PDUs have not arrived at its buffer (S80-S82).

The RX RLC entity then transmits the constructed receiving-side-related control information to the TX RLC entity through the second logical channel that has been configured to be used only to transmit the receiving-side-related control information (S87). Here, the RX RLC entity can use a specific RLC PDU in order to transmit the receiving-side-related control information. The TX RLC entity can immediately process the receiving-side-related control information and perform an associated process (S88). Specifically, the TX RLC entity retransmits an RLC PDU when the receiving-side-related control information indicates that the RLC PDU has not been successfully received (S89). That is, when receiving the NACK information in the control information of the RLC PDU, the TX RLC processes the NACK information in the control information and retransmits the RLC PDU when needed.

In the above procedure, the RX RLC entity can transmit to the TX RLC entity not only control information associated with received data but also user data and control information associated with the user data that is transmitted by the TX RLC entity. The RX RLC entity can additionally construct and transmit transmitting-side-related control information to the TX RLC entity. Here, the RX RLC entity can transmit the transmitting-side-related control information through one of the two logical channels (i.e., the first logical channel), which has not been configured to transmit only the receiving-side-related control information.

In another method of configuring a channel dedicated to receiving-side-related control information, an AM RLC entity is connected to two logical channels as assumed above and the second one of the two logical channels is configured so as not to be used to transmit user data and control information other than the receiving-side-related control information.

The AM RLC entity (i.e., the RX RLC entity) receives RLC PDUs from the peer AM RLC entity (i.e., the TX RLC entity) and constructs receiving-side-related control information when the RX RLC entity has detected that it has not successfully received some RLC PDUs or that some RLC PDUs have not arrived at its buffer (S80-S82). The RX RLC entity can select one of the two configured (first and second) logical channels and transmit the constructed receiving-side-related control information through the selected channel. Here, the RX RLC entity can use a specific RLC PDU in order to transmit the receiving-side-related control information. In this case, it will be preferable that the RX RLC entity transmit the receiving-side-related control information through the second logical channel (S87).

In this case, the RX RLC entity may also additionally construct and transmit transmitting-side-related control information to the TX RLC entity. Here, the RX RLC entity can transmit the transmitting-side-related control information through one of the two configured logical channels (i.e., the first logical channel) which is not prohibited from transmitting transmitting-side-related control information.

In this procedure, when receiving the receiving-side-related control information, the TX RLC entity can immediately process the receiving-side-related control information and perform an associated process (S88). Specifically, the TX RLC entity retransmits an RLC PDU when the receiving-side-related control information is NACK information in the control information, which indicates that the RLC PDU has not been successfully received (S89).

Separately transmitting the receiving-side-related control information and the transmitting-side-related control information in the above manner makes it possible to separately configure transmission/reception methods, the order of processing, the speed, and the like according to the characteristics of the control information, thereby achieving efficient communication.

Figure 9:
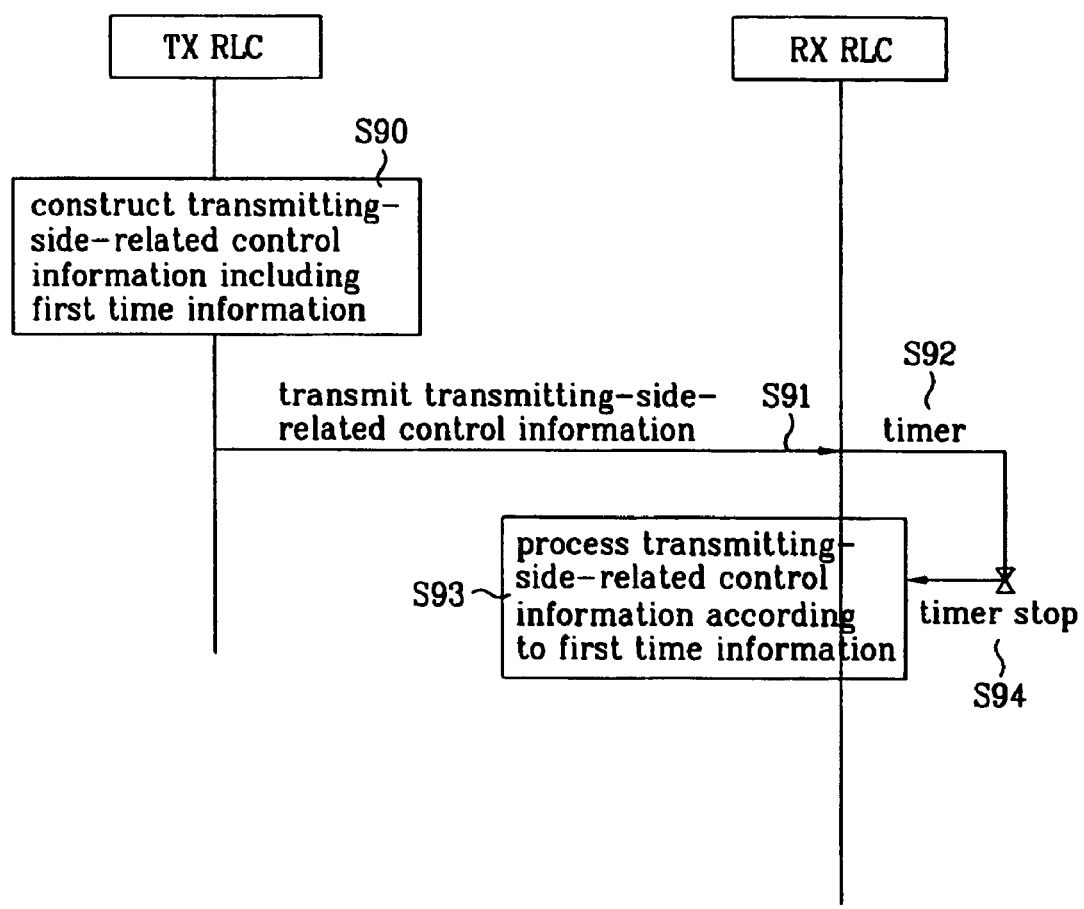
FIG. 9 is a flow chart illustrating another embodiment of the invention.

FIG. 9 is a flow chart illustrating another embodiment of the invention.

According to this embodiment of the invention, transmitting-side-related control information can be transmitted together with first time information which is related to a start time for processing the transmitting-side-related control information as to the time when the transmitting-side-related control information is to be processed.

An RLC entity (i.e., the TX RLC entity) transmits transmitting-side-related control information together with information of a desirable time when the transmitting-side-related control information is to be processed. This first time information can be transmitted separately and is preferably transmitted in the transmitting-side-related control information.

Specifically, the TX RLC entity constructs transmitting-side-related control information including the time information about when the control information is to be processed (S90) and transmits the transmitting-side-related control information including the first time information to the RX RLC entity (S91). The RX RLC entity receives control information. If the received control information includes the first time information, the RX RLC entity processes the control information at the time indicated by the time information (S93).

The first time information may include at least one of information as to the time when control information was created at the TX RLC entity, information as to the time when control information is to be processed at the RX RLC entity, a Connection Frame Number (CFN) which is a time reference set at each UE, a System Frame Number (SFN) which is a time reference at one cell, sequence number information included in user data (i.e., an RLC PDU) that the RLC entity has transmitted immediately before the control information is transmitted, and sequence number information included in user data (i.e., an RLC PDU) that the RLC entity will transmit after the control information is transmitted.

In the case where the first time information is information as to the time when control information was created or information as to the time when control information is to be processed, the RX RLC entity processes the control information at the time indicated by the first time information.

In the case where the first time information is an SFN or CFN, the RX RLC entity processes the control information at the time corresponding to the SFN or CFN. In the case where the first time information is sequence number information included in an RLC PDU, which is that of user data that the RX RLC entity has transmitted last, immediately before the control information is transmitted, the RX RLC entity which has received the control information can process the control information after the RLC PDU is processed. In the case where the first time information is sequence number information included in an RLC PDU, which is that of user data that the RLC entity will transmit after the control information is transmitted, the RX RLC entity can process the control information immediately before the RLC PDU is processed.

However, when the first time information is a sequence number of an RLC PDU, the RLC PDU may not arrive at the receiving side. In this case, a problem may occur in processing the control information if the RLC PDU is not received since the first time information of the transmitting-side-related control information is associated with the RLC PDU. That is, the RLC entity which is to process RLC status information can process the RLC status information according to the first time information only after the RLC PDU is received. Accordingly, if the RLC PDU does not arrive at the RLC entity, the RLC entity will not be able to process the RLC status information, thereby causing an error.

According to this embodiment of the invention, transmitting-side-related control information can be transmitted together with second time information which is related to a maximum time permitted for processing the first control information. When transmitting control information, for example RLC status information, the RLC entity transmits the second time information to indicate the time within which it is desirable to process the RLC status information. That is, the second time information indicates the desirable time to complete the processing of control information or the like.

Examples of the second time information include a Connection Frame Number (CFN) which is a time reference set at each UE, a System Frame Number (SFN) which is a time reference at one cell, and a timer value.

In the case where the second time information is a CFN or SFN, the RLC entity processes control information at the time corresponding to the CFN or SFN transmitted as the second time information if the control information has not yet been processed at the time according to the processing time information. In the case where the second time information is a timer value, the RLC entity which has received the control information can use a timer in order to complete the processing of the control information until a time limit corresponding to the second time information.

The following is a more detailed description of the operation of the timer. When a timer value is used as the second time information, the timer value indicates the time within which control information, for example RLC status information, should be processed. In this case, when receiving RLC status information, the RX RLC entity activates a timer using the timer value. The RX RLC entity deactivates the timer when receiving, while the timer is running, data identical to first time information received together with the RLC status information. Then, when the timer expires, the RX RLC entity processes the RLC status information.

As shown in FIG. 9, the RX RLC entity deactivates the timer (S94) if the control information has been processed at the time specified according to the first time information before the timer expires (S93). For example, in the case where first time information included in RLC status information is a sequence number of an RLC PDU, the RX RLC, which has received the RLC PDU, processes the control information before or after processing the RLC PDU and deactivates the timer.

Figure 10:
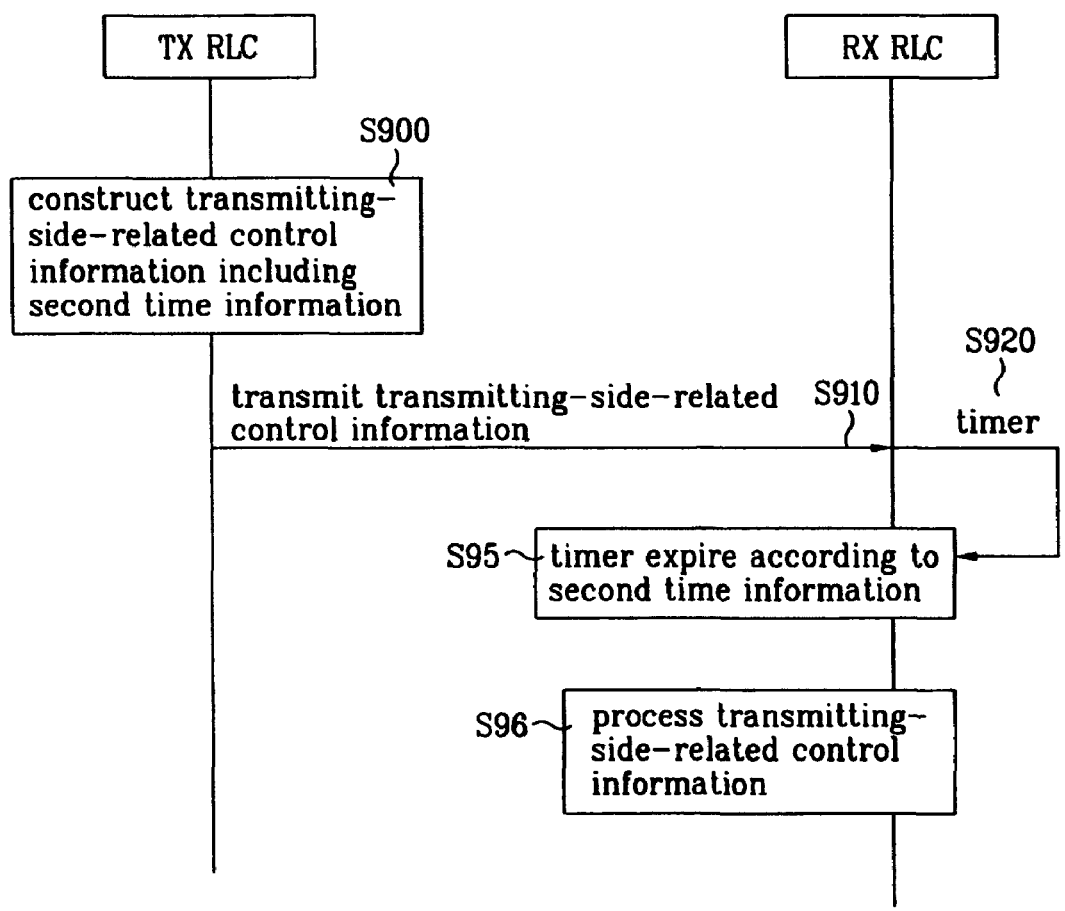
FIG. 10 is a flow chart illustrating another embodiment of the invention.

However, as shown in FIG. 10, in the case where control information has not been processed until the timer expires according to the second time information, the RX RLC entity processes the control information at the time when the timer expires regardless of the first time information (S95, S96).

The first time information or the second time information can be set to be identical for each control information. Since the each control information, for example status information, has different contents, the processing time limit of the each status information, which is the time limit within which the peer RLC should complete the processing of the status information after the status information is created and transmitted, may be different.

In the case where control information including first time information is transmitted, preferably together with second time information, as in the above embodiment, the receiving side of the control information can properly process the control information even when the receiving side has received the control information in a different order from that in which the control information was transmitted from the transmitting side. In this case, an RLC entity, for example an RLC entity transmitting control information, can be connected to a single or more channels used to transmit the control information. The RLC entity suggested in the embodiment of the invention may also be connected to two or more channels.

That is, although a single channel used to transmit control information can be connected to an RLC entity, the transmitting side of control information (for example, RLC status information) can transmit the RLC status information, together with first time information, through the channel. Then, the receiving side of the RLC status information including the first time information can properly process RLC PDUs and the status information using the first time information even when the order of the RLC PDUs has been changed during the procedure where the transmitting side transmits them to the receiving side.

Thus, transmitting the time information allows the RLC entity to operate correctly even though only one logical channel is connected to the RLC entity in the procedure. When RLC status information is transmitted together with time information, transmitting-side-related status information and receiving-side-related status information can be transmitted through the same message for a similar reason.

In the above case, when receiving-side-related status information is included in the control information (for example, RLC status information), the receiving side of the control information processes the control information immediately after receiving the control information. When transmitting-side-related status information is included in the RLC status information, the receiving side processes the RLC status information at the time based on the first time information received together with the RLC status information.

As described above, the RLC entity, which has received the transmitting-side-related control information, can prevent the error described above through information indicating when the transmitting-side-related control information is to be processed.

In addition, setting a processing time limit using the timer or the like according to the second time information as described above can prevent received control information from being left unprocessed. The problem occurring in a preset processing time reference in the case where the control information has been set to be processed at the time corresponding to the first time information, can be solved and thereby achieving more efficient communication.

Figure 11:
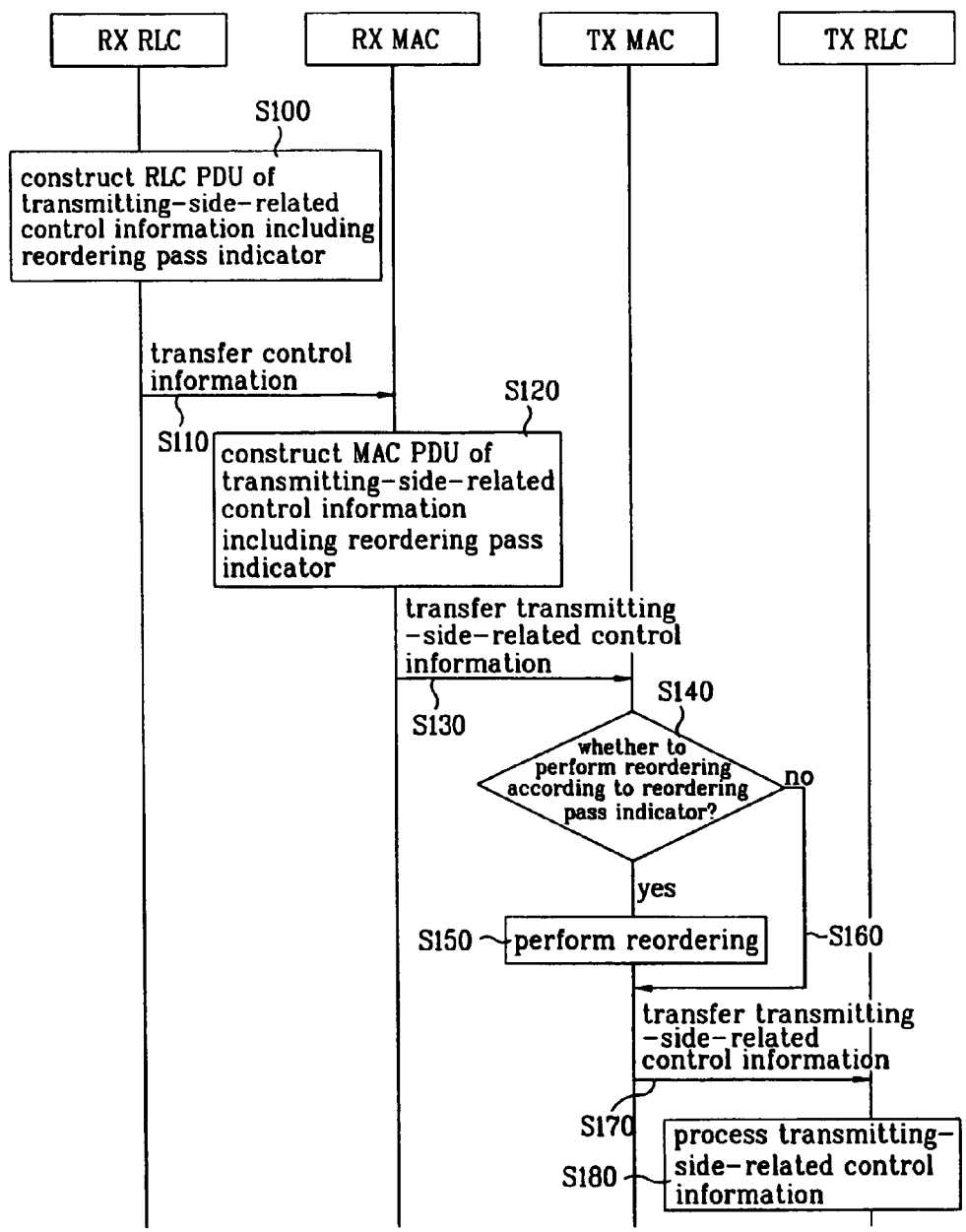
FIG. 11 is a flow chart illustrating another embodiment of the invention.

FIG. 11 is a flow chart illustrating another embodiment of the invention.

As described above, in the case where an RLC entity is connected to a single logical channel, a problem may occur when reordering is performed at a lower entity if transmitting-side-related control information arrives at the RLC entity earlier than an RLC PDU that was transmitted before the transmitting-side-related control information.

However, receiving-side-related control information causes no problem even if the receiving-side-related control information arrives at the peer RLC entity earlier than the RLC PDU.

Thus, according to this embodiment of the invention, an entity which receives receiving-side-related control information can omit the reordering procedure at its lower entity. To accomplish this, according to the invention, when an RLC entity transfers receiving-side-related control information to a lower entity in order to transmit the receiving-side-related control information, a reordering pass indicator can be configured and transmitted, together with the receiving-side-related control information, to the lower entity.

As shown in FIG. 11, a RX RLC entity configures information as to whether or not the reordering is to be performed (i.e., a reordering pass indicator) and constructs an RLC PDU (S100) and transfers the RLC PDU together with the reordering pass indicator to a lower entity (i.e., a RX MAC entity) (S110). When the reordering pass indicator has been configured, the RX MAC entity constructs a MAC PDU including the RLC PDU received together with the reordering pass indicator (S120).

The RX MAC entity then transmits the constructed MAC PDU to the peer entity (i.e., an TX MAC entity) (S130). Here, the RX MAC entity transmits the MAC PDU including an indicator that the RLC PDU should be immediately transferred to the upper layer without reordering.

When receiving the MAC PDU, an TX MAC entity determines whether or not the MAC PDU includes the indicator that the RLC PDU should be immediately transferred to the upper layer without reordering (S140).

If the MAC PDU does not include the indicator, the TX MAC entity transfers the RLC PDU to the upper layer (i.e., an TX RLC entity) after performing reordering (S150, S170). On the other hand, if the MAC PDU includes the indicator that the RLC PDU should be immediately transferred to the upper layer without reordering (S160), the TX MAC entity immediately transfers the RLC PDU associated with the indicator to the upper RLC entity without performing reordering (S170). When receiving the control information or the like, the upper RLC entity processes the control information (S180).

The reordering pass indicator may be included in control information to be transmitted so that it is used to determine whether or not to perform reordering, only when it indicates that reordering is not to be performed.

A specific information bit can also be allocated such that it is always included in control information to be transmitted.

For example, in the case where one bit is allocated, it can indicate, when set to "0", that reordering is to be performed, whereas it can indicate, when set to "1", that control information is to be transferred to the upper layer without performing reordering.

Preferably, only one RLC PDU can be included in the MAC PDU in the above embodiment. More preferably, receiving-side-related control information alone is included in an RLC PDU.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

As is apparent from the above description, the present invention provides a method for transmitting control information in a mobile communication system with a variety of advantages. For example, the receiving-side RLC entity can transmit control information to the transmitting side as quickly as possible. The transmitting side can also start retransmitting RLC PDUs as quickly as possible, thereby increasing the data transmission rate in the communication system.

The invention claimed is:

1. An apparatus for transmitting Protocol Data Unit (PDU) in a mobile communication system, the apparatus comprising:
   a Radio Link Control (RLC) entity in acknowledged mode, the RLC entity receiving data from an upper layer and generating a data PDU and one or more control PDUs; and
   a Medium Access Control (MAC) entity connected with the RLC entity via a first logical channel and a second logical channel,
   wherein the data PDU and a first control PDU are transmitted via the first logical channel, and a second control PDU is transmitted via the second logical channel,
   wherein the first control PDU includes a Reset PDU, a Reset ACK PDU and a piggybacked status PDU,
   wherein the second control PDU includes a status PDU containing acknowledgement information.

2. The apparatus of claim 1, wherein the first logical channel and the second logical channel are mapped to an E-DCH (Enhanced-Dedicated Channel) which is located between the MAC entity and a physical layer.

3. The apparatus of claim 1, wherein the upper layer is at least one of a RRC (Radio Resource Control) layer, a PDCP (Packet Data Convergence Protocol) layer and a BMC (Broadcast/Multicast Control) layer.

4. The apparatus of claim 1, wherein the first control PDU includes at least one of first time information and second time information.

5. The apparatus of claim 4, wherein the first time information is related to a start time for processing the first control PDU and the second time information is related to a maximum time permitted for processing the first control information.

6. The apparatus of claim 4, wherein the first time information and the second time information are configured using at least one of a CFN (Connection Frame Number), a SFN (System Frame Number), a SN (sequence number) and a value of a timer.

7. The apparatus of claim 1, wherein the second control PDU includes an indicator to indicate whether or not to reorder the second control.

8. The apparatus of claim 1, wherein the apparatus includes a user equipment.

9. A method of transmitting protocol data unit (PDU) at a Radio Link Control (RLC) entity in acknowledged mode (AM), wherein the RLC entity in AM is configured in an apparatus used for a mobile communication system, the method comprising:
- receiving data from an upper layer;
- generating at least one of a data PDU and one or more control PDUs; and
- transmitting at least one of a data PDU and one or more control PDUs to a Medium Access Control (MAC) entity via a first channel and a second channel,
- wherein the data PDU and a first control PDU are transmitted via the first logical channel, and a second control PDU is transmitted via the second control channel,
- wherein the first control PDU includes a Reset PDU, a Reset ACK PDU and a piggybacked status PDU,
- wherein the second control PDU includes a status PDU containing acknowledgement information.

10. The method of claim 9, wherein the first logical channel and the second logical channel are mapped to an E-DCH (Enhanced-Dedicated Channel) which is located between the MAC entity and a physical layer.

11. The method of claim 9, wherein the upper layer is at least one of a RRC (Radio Resource Control) layer, a PDCP (Packet Data Convergence Protocol) layer and a BMC (Broadcast/Multicast Control) layer.

12. The method of claim 9, wherein the first control PDU includes at least one of first time information and second time information.

13. The method of claim 12, wherein the first time information is related to a start time for processing the first control PDU and the second time information is related to a maximum time permitted for processing the first control PDU.

14. The method of claim 12, wherein the first time information and the second time information are configured using at least one of a CFN (Connection Frame Number), a SFN (System Frame Number), a SN (sequence number) and a value of a timer.

15. The method of claim 9, wherein the second control PDU includes an indicator to indicate whether or not to reorder the second control PDU.

16. The method of claim 9, wherein the apparatus includes a user equipment.

* * * * *